United States Patent
Tomoiu

(10) Patent No.: US 6,804,963 B1
(45) Date of Patent: Oct. 19, 2004

(54) THERMOREACTOR WITH LINEAR TO ROTATIONAL MOTION CONVERSION

(76) Inventor: Constantin Tomoiu, 65 Oak Rd., West Haven, CT (US) 06516

( * ) Notice: Subject to any disclaimer, the term of this patent is extended or adjusted under 35 U.S.C. 154(b) by 0 days.

(21) Appl. No.: 09/516,131

(22) Filed: Mar. 1, 2000

Related U.S. Application Data

(60) Provisional application No. 60/123,595, filed on Mar. 10, 1999.

(51) Int. Cl.[7] .............................................. F01K 1/00
(52) U.S. Cl. ........................................................ 60/670
(58) Field of Search ......................... 60/670; 123/43 A, 123/43 AA

(56) References Cited

U.S. PATENT DOCUMENTS

| | | | | |
|---|---|---|---|---|
| 3,844,258 A | * | 10/1974 | Howell | 123/43 AA |
| 3,918,412 A | * | 11/1975 | Lindstrom | 123/3 |
| 4,004,554 A | * | 1/1977 | Kosaka et al. | 123/3 |
| 4,878,830 A | * | 11/1989 | Henderson | 431/10 |
| 5,103,778 A | * | 4/1992 | Usich, Jr. | 123/56.8 |

* cited by examiner

*Primary Examiner*—Hoang Nguyen
(74) *Attorney, Agent, or Firm*—Fattibene & Fattibene; Paul A. Fattibene; Arthur T. Fattibene

(57) ABSTRACT

A fuel conversion chamber receiving liquid and gas fuels and converting the liquid fuels into gas fuels by heating, and extracting hydrogen. Hydrogen is extracted at extreme temperature in an ultrasound field and the fuels are accelerated to hypersonic velocity. The gas fuels are injected into a resonance chamber, which generates ultrasound, in a combustion chamber and efficiently burned. The reaction generates a high temperature plasma. The hot combustion or exhaust gases heat the fuel conversion chamber, an air heat exchanger, and water chamber producing steam. The steam and exhaust gases are used to produce work.

27 Claims, 5 Drawing Sheets

THERMOREACTOR WITH LINEAR TO ROTATIONAL MOTION CONVERSION

RELATED APPLICATION

This application claims priority on U.S. provisional application No. 60/123,595 filed Mar. 10, 1999.

FIELD OF THE INVENTION

The present invention relates in general to a thermoreactor, and more particularly to a thermoreactor utilizing fuel conversion and an ultrasonic chamber.

BACKGROUND OF THE INVENTION

There are many types of engines utilizing hydrocarbon fuels. Many of these engines are adapted to burn a particular fuel relatively efficiently. Many engines are adapted to burn liquid fuels only. Engines that burn liquid fuels have relatively complex fuel injection or carburetor systems to facilitate even or controlled burning of the liquid fuels. Often in may be desirable to burn gas fuels. However, gas fuels are often difficult to store, transport and transfer. Therefore, there is a need for an engine that can combine the storage and availability advantages of using liquid fuels with the burning efficiencies and simplicities of gas fuels.

Additionally, often engines can efficiently provide linear motion which, in order to perform useful work must be converted into rotational motion. Often this is done with relatively complicated and inefficient mechanical devices. Therefore there is a need for an efficient mechanically simple device for converting linear motion into rotational motion.

SUMMARY OF THE INVENTION

The present invention is a thermoreactor for converting liquid fuels to gas fuels, which are burned to perform work. A fuel conversion chamber is used to heat liquid fuel to a high temperature converting the liquid fuel to a gas fuel. The gas fuel is injected into a combustion chamber with the combustion gases being used to heat the fuel conversion chamber, air, and water, as well as to do work. Sensors are used throughout the thermoreactor and are coupled to a controller for monitoring and controlling operation of the thermoreactor. Gas pressure created by the thermoreactor is converted to rotational motion by a linear to rotational motion converter device. The device converts linear motion of a piston driven by gas pressure to rotational motion of a shaft. A bearing connected to a piston shaft rides in a groove formed in a rotor. The groove is angled relative to the axis of the rotating shaft.

Accordingly, it is an object of the present invention to efficiently burn a fuel.

It is a further object of the present invention to convert linear motion into rotational motion.

It is an advantage of the present invention that a variety of fuels may be used.

It is an advantage of the present invention that the linear to rotational motion conversion device has a relatively simple and reliable mechanical structure.

It is a feature of the present invention that liquid fuels are converted to gas fuels.

It is a feature of the present invention that the linear to rotational motion conversion device uses a surface transverse to the axis of a rotating shaft.

These and other objects, advantages, and features will become apparent in view of the following more detailed description.

DETAILED DESCRIPTION OF THE PREFERRED EMBODIMENT

Figure 1:
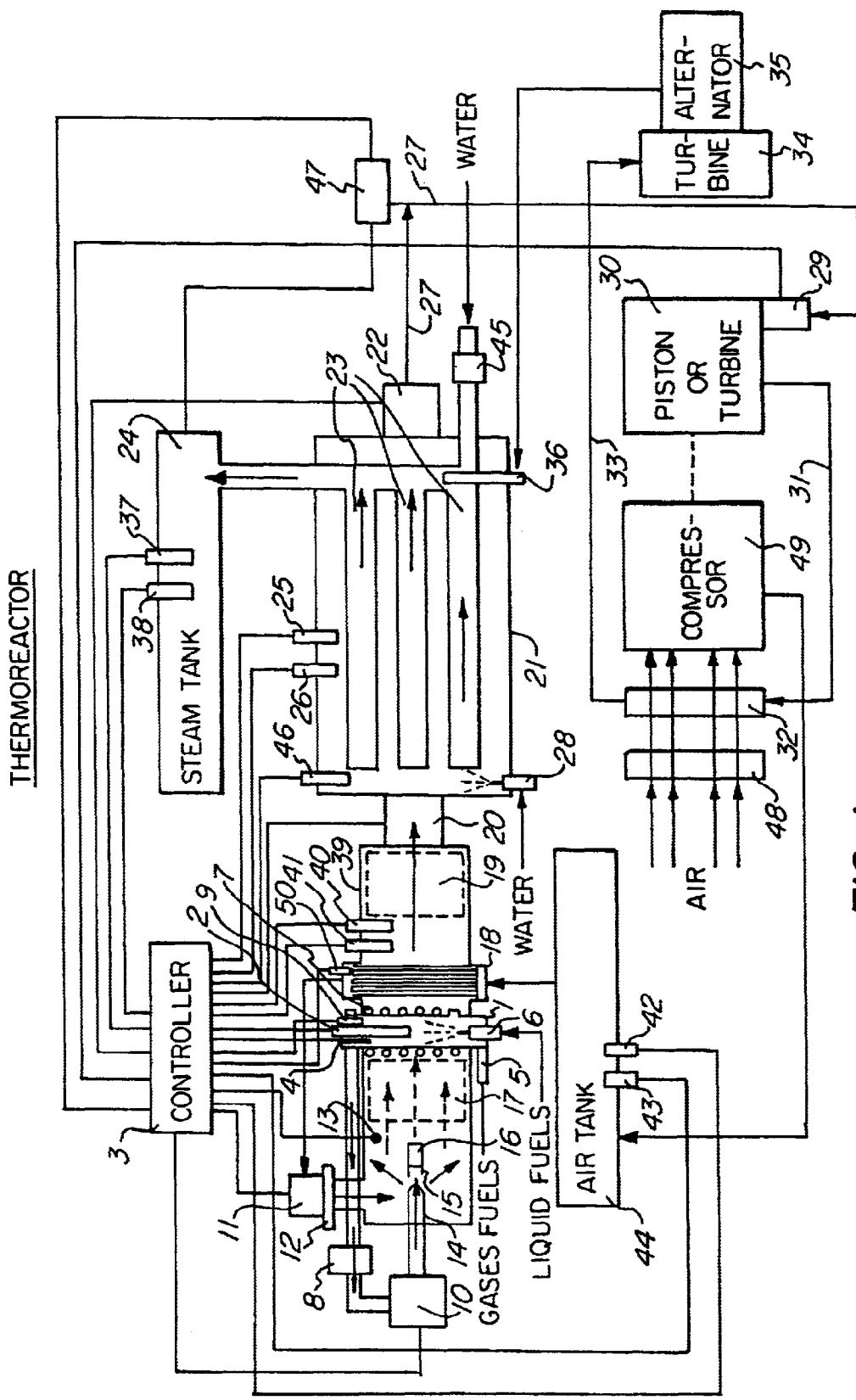
FIG. 1 schematically illustrates the thermoreactor system of the present invention.

FIG. 1 is a schematic illustration illustrating the thermoreactor of the present invention. A valve 5 meters gas fuels and a fuel injector 6 meters liquid fuels into a fuel conversion chamber 1. A controller 3 is coupled to a temperature sensor 4, which helps to monitor the process. A coiled tubing 7 acts as a heat exchanger helping to increase or maintain the temperature within the fuel conversion chamber 1 in combination with an electric heater element 2 placed within the fuel conversion chamber 1. Once the fuel is injected into the fuel conversion chamber 1, the temperature is increased to a set value by electric heater 2, process controller 3 and temperature sensor 4. Once liquid fuel is injected into chamber 1, it is atomized or formed into small particles. The liquid atomized particles or gas are converted to new gaseous fuels while progressing through chamber 1 and expanding into coiled tubing 7. In the absence of oxygen at a precisely set high temperature value, the fuels are converted into new gas fuels. For example,

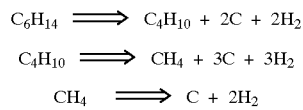

The free carbon released from the thermoreaction doesn't further react and is collected by a carbon separator 8. To convert the original fuels efficiently up to 100%, the temperature in the fuel conversion chamber 1, coiled tubing 7, and combustion chamber 39 must be kept at a high temperature. Therefore, high temperature materials such as tungsten, tungsten alloy and high temperature ceramics are desirable. To keep pressure and temperature in the fuel conversion chamber 1 at the desired value, they are monitored by the controller 3 with the temperature sensor 4 and the pressure sensor 9. When the temperature and pressure in the fuel conversion chamber 1 reaches a predetermined value, the controller 3 opens air metering valve 11, converted fuel metering valve 10, and ozone generator 12. With the opening of converted fuel metering valve 10, the gaseous fuels flow through nozzle 14 with hypersonic velocity and into a resonance chamber 15. The resonance chamber 15 generates ultrasonic waves and the gaseous fuels are mixed with air and ignited by spark plug 13. The free piston 16 placed within the resonance chamber 15 changes the resonance of the chamber by predetermined variations. The combustion of the gaseous fuels and air progresses through a ceramic honeycomb 17 coated with tungsten, around the coiled tubing 7 wrapped around the fuel conversion chamber 1, through an air heat exchanger 18, a second ceramic honeycomb 19 coated with tungsten, through valve 20, and into a second heat exchanger 21. Associated with heat exchanger 18 is a temperature sensor 50. The temperature sensor 50 is coupled to controller 3. Valve 22 is placed at the other end of the heat exchanger 21. The heat exchanger 21 heats up water chambers 23, generating steam. The steam may be stored in steam tank 24. A pressure sensor 25 and temperature sensor 26 monitor the pressure and temperature within the heat exchanger 21 and are controlled by controller 3. An oxygen sensor 46 is also associated with heat exchanger 21 and is coupled to controller 3. When the temperature in the heat exchanger 21 drops to a set value valve 20 is closed, and water injector 28 may inject an amount of water. This results in the temperature of the mixture of combustion gases and steam to drop to a set value, such as 300 to 500 degrees Fahrenheit. Valve 22 is opened and the pressurized mixture flows through line 27 and metering valve 29 to a piston or turbine 30 and is exhausted through line 31 to a heat exchanger 32 through line 33 to a small turbine 34, which rotates an alternator 35 powering an electric heater element 36 to heat the water in chamber 23. The steam stored in tank 24 may also be released through valve 47 to do work. Tank 24 has a temperature sensor 37 and a pressure sensor 38 which are both coupled to controller 3. Compressor 49 receives air through an activated carbon filter 48 and heat exchanger 32 and stores the pressurized air in tank 44. Temperature sensor 40 and pressure sensor 41 monitor the pressure and temperature within the combustion chamber 39. The temperature sensor 42 and the pressure sensor 43 monitor the pressure and temperature in the air tank 44 and are coupled to the controller 3. The water chambers 23 in the heat exchanger 21 may be supplied through water valve 45.

Figure 2:
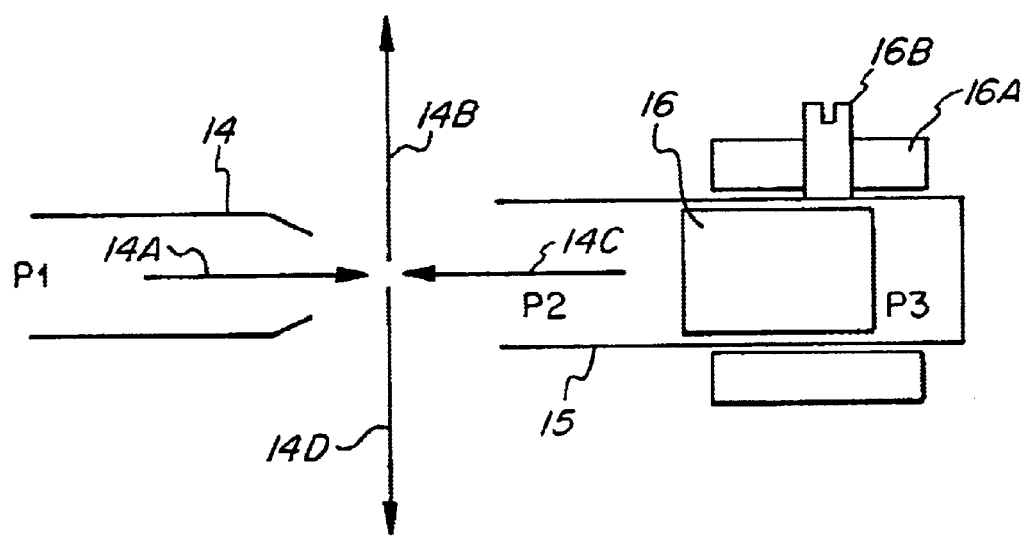
FIG. 2 schematically illustrates the nozzle and resonance chamber used in the combustion chamber of the thermoreactor of the present invention.

FIG. 2 more clearly illustrates the ultrasonic device within the combustion chamber 39 illustrated in FIG. 1. The ultrasonic device converts kinetic energy of the gaseous fuels into acoustic energy. A jet of gaseous fuels flows through nozzle 14 with a pressure P1 at a hypersonic velocity into resonance chamber 15. A free piston 16 is caused to move back and forth within the resonance chamber 15. A support 16A holds the resonance chamber 15 in position while a screw 16B may be tightened or loosened to move the resonance chamber 15 closer to or further away from the nozzle 14. In operation, as the pressure in the resonance chamber 15 increases and reaches a value P2 where P2 is greater than P1, the jet of gaseous fuels start to flow in an opposite direction, from the chamber 15 towards the nozzle 14. Arrow 14A represents the direction of gaseous fuels from nozzle 14. Arrow 14C represents the direction of gaseous fuels from the chamber 15. When the gaseous fuels collide they change direction and are directed in a generally perpendicular direction indicated by arrows 14B and 14D. This change in direction helps to mix the gaseous fuels with air in the combustion chamber. In this time, the free piston 16 takes a position in chamber 15 with a pressure P3 in the bottom of the chamber and a pressure P2 in the open end of the chamber where P3 is equal to P2. When the gaseous flow begins to start changing direction, P2 starts to decrease and at this very moment, P3 is greater than P2 and piston 16 is moved forward towards the nozzle 14, decreasing the depth of the chamber 15. The changing of the length or depth of the chamber 15 by the free piston 16 keeps the ultrasound frequency at about a constant value. The ultrasound frequency will depend upon the velocity of the gases, the depth of the resonance chamber 15, the lengths between the nozzle and the resonance chamber, as well as other parameters. The velocity will depend upon the pressure and the geometry of the nozzle 14. The variations in pressure are caused by variations of P2 and P3 in chamber 15 and by the pressure P1 caused by the combustion cycle. The ultrasound frequency is believed to greatly facility the atomization and conversion of the fuel.

Figure 3:
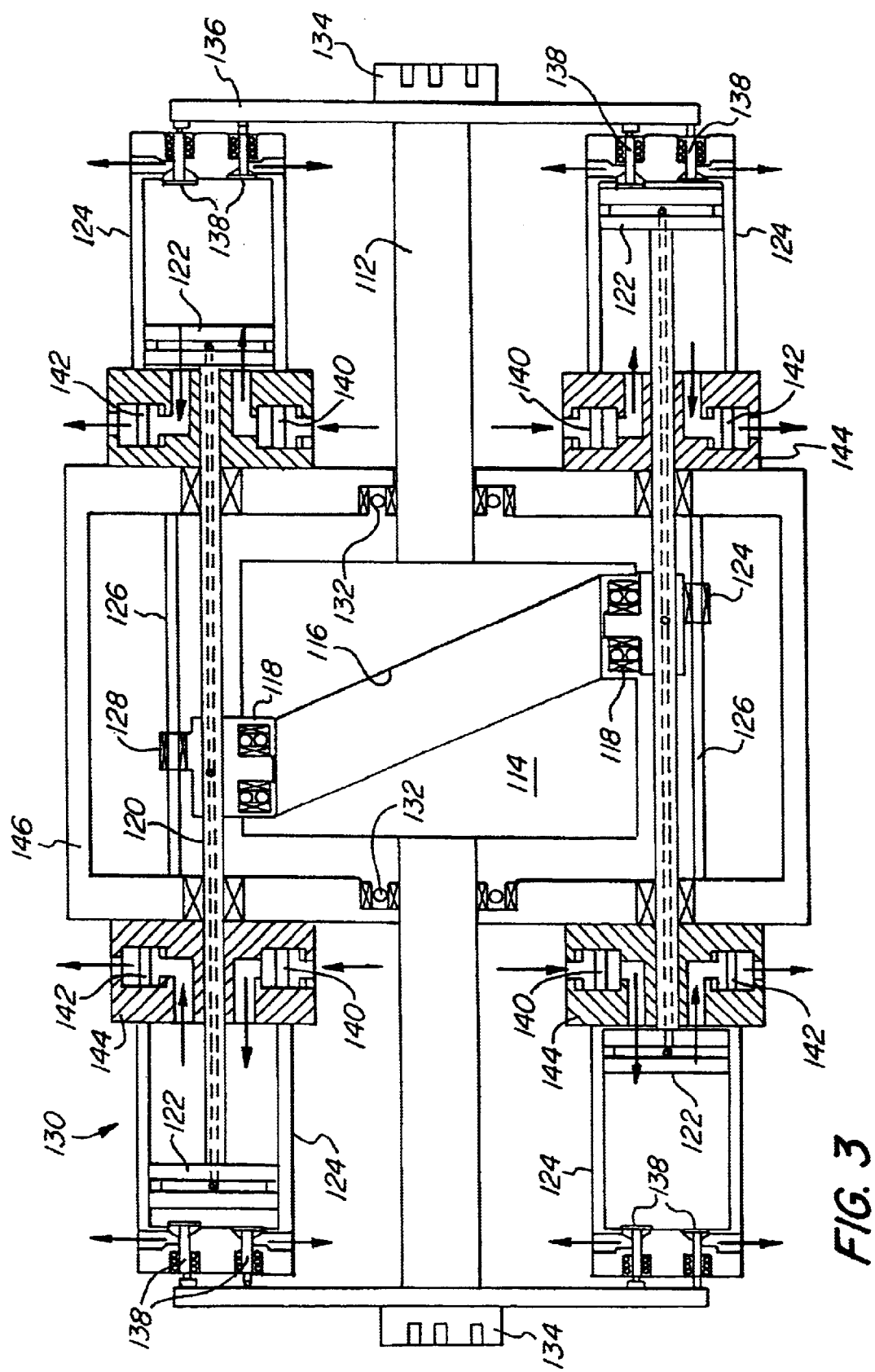
FIG. 3 is a partial cross section illustrating an embodiment of the linear motion to rotational motion converter device of the present invention.

FIG. 3 illustrates a particular structure for converting the pressurized gas into a rotary motion that may be used with the thermoreactor illustrated in FIG. 1. The device 130 has a shaft 112 attached to a rotor 114. The rotor 114 has an angled groove 116 placed therein. Riding within the angled grooves are a set of bearings 118. A piston shaft 120 is coupled to each of the bearings 118 riding within the groove 116. A guide rod 126 and linear rod bearing 128 help to guide and support the bearings 118. The pistons 122 through a plurality of valves are caused to reciprocate back and forth, causing the shaft 120 to reciprocate back and forth, causing the bearings 118 to ride within the angled groove 116, thereby rotating shaft 112. The shaft 112 is permitted rotate with shaft bearings 132. The pistons 122 are held within cylinders 124. Inlet valves 140, which may be coupled to the steam tank 24 or water chambers 23 through valve 22, let high pressure steam in to cylinders 124 causing piston 122 to at move. Valves 138 are moved by cams 136 and are timed to permit the cylinders 124 to exhaust as pistons 124 are moved. Cams 136 are coupled to the shaft 112. Return exhaust valves 142 exhaust the cylinders 124 when the pistons 122 are returned by the movement of an opposing piston. Heads 144 connect the cylinders 124 and valves 140 and 142 to the housing 146. As the pressurized gas or steam from the thermoreactor drives the pistons 122 linearly, the movement of the bearings 118 within the groove 116 causes the rotor 114 and shaft 112 to rotate or turn. At the ends of the shaft 112 are couplings 134. Couplings 134 permit multiple devices to be serially coupled together.

Figure 4:
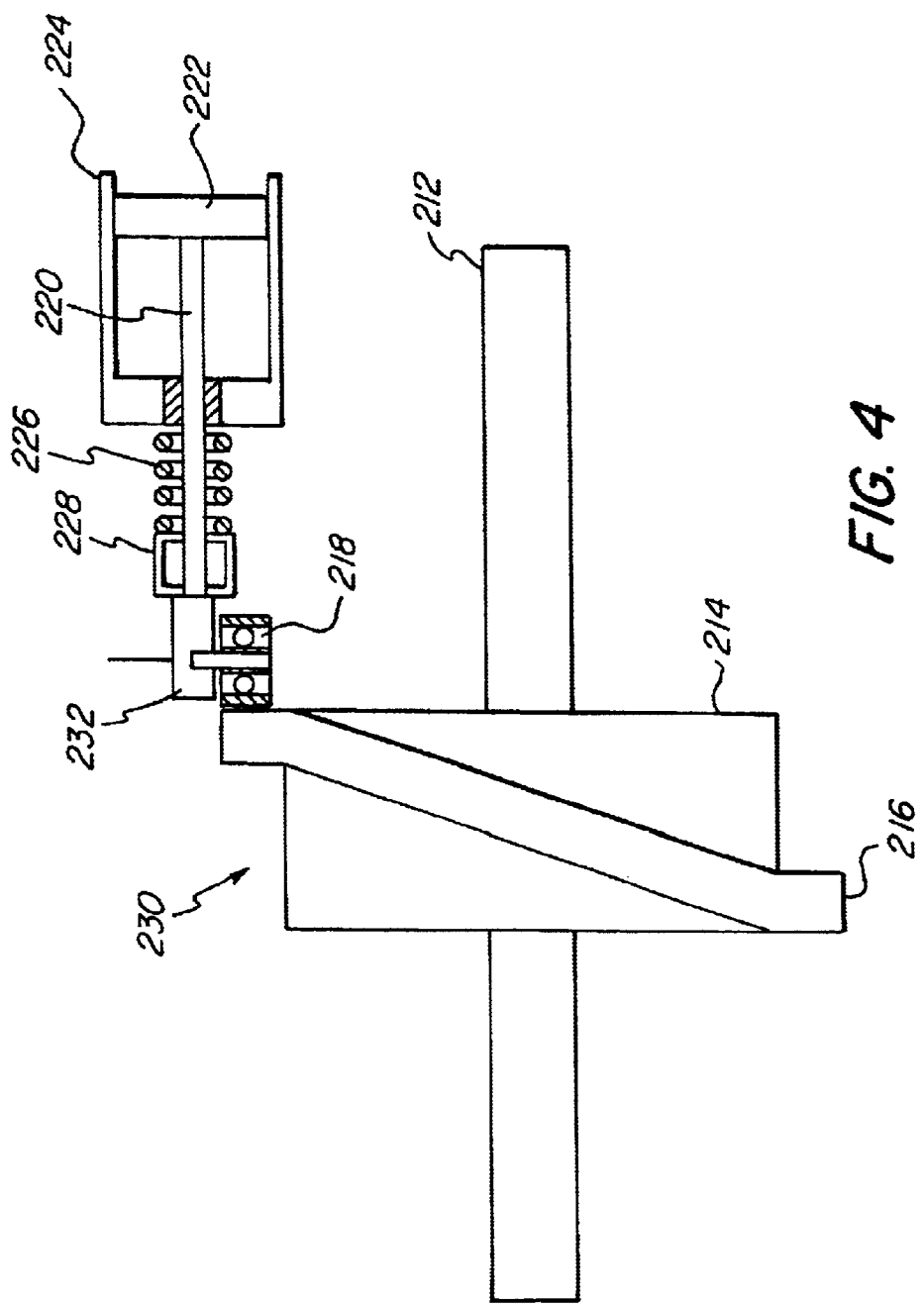
FIG. 4 is a partial cross section illustrating another embodiment of the linear motion to rotational motion converter device of the present invention.

FIG. 4 illustrates a simplified version of the linear to rotary motion conversion device 30 illustrated in FIG. 3. In FIG. 4, a shaft 212 is coupled to a rotor 214 that has a raised cam surface 216 thereon. Bearing 218 rides on the raised cam surface 216 and is coupled to a piston shaft 220. The piston 222 lying within a cylinder 224 causes the bearing 218 to ride on the raised cam surface 216 causing the rotor 214 to rotate along with the shaft 212. A spring 226 helps to return the piston 222 into position and helps the bearing 218 to follow the cam surface 216.

Figure 5:
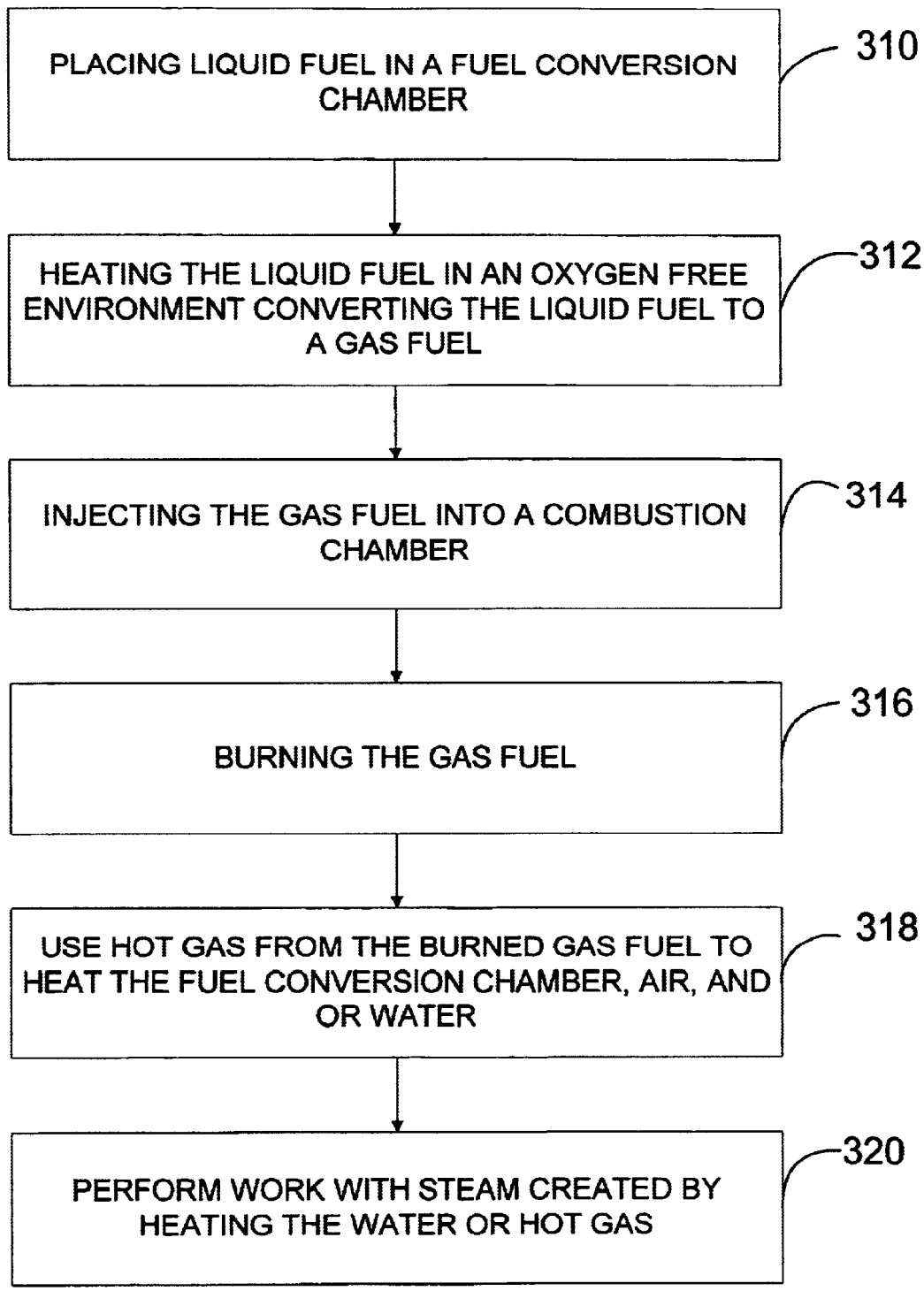
FIG. 5 is a block diagram illustrating the thermoreactor method or process of the present invention.

FIG. 5 is a block diagram illustrating the method or process steps for the thermoreactor of the present invention. Block 310 represents the step of placing a liquid fuel in a fluid conversion chamber. Block 312 represents the step of heating the liquid fuel in the absence of oxygen to form a gas fuel. Block 314 represents the step of injecting the gas fuel into a combustion chamber. Block 316 represents the step of burning the gas fuel. Block 318 represents the step of using the hot combustion or exhaust from the burned gas fuel to heat the fuel conversion chamber, air, and or water. Block 320 represents the step of performing work with the steam created by heating the water or hot combustion gas or exhaust.

Accordingly, it should be appreciated from FIGS. 1, 2 and 5 that the present invention of a thermoreactor has the advantage of using different fuels and converting them for more efficient combustion, as well as uses the resultant energy to advantage with various conversion devices and heat exchangers. The linear to rotational motion device illustrated in FIGS. 3 and 4 are particularly well suited for use in the thermoreactor of the present invention, but may also be used independently thereof.

Therefore, the present invention may be applied to many different applications. Accordingly, while various embodiments have been illustrated and described, it should be appreciated to those skilled in the art that modifications or variations may be made without departing from the spirit and scope of this invention.

What is claimed is:

1. A thermoreactor comprising:
   a fuel conversion chamber;
   a heater heating said fuel conversion chamber, whereby liquid fuel is converted into gas fuel;
   a combustion chamber;
   a conduit coupling said fuel conversion chamber to said combustion chamber, whereby gas fuel is delivered into said combustion chamber;
   an injector nozzle coupled to said conduit in said combustion chamber;
   a resonance chamber placed adjacent said injector nozzle, whereby kinetic energy of the gas fuel is converted into acoustic energy; and
   an ignition source, said ignition source igniting the gas fuel,
   whereby the liquid fuel is converted into the gas fuel and burned providing energy to do work.

2. A thermoreactor as in claim 1 wherein:
   said fuel conversion chamber is heated by combustion gas from said combustion chamber.

3. A thermoreactor as in claim 1 further comprising:
   an air heat exchanger positioned to be heated by the combustion gas.

4. A thermoreactor as in claim 1 further comprising:
   a water chamber positioned to be heated by the combustion gas.

5. A thermoreactor comprising:
   a fuel conversion chamber;
   a heater heating said fuel conversion chamber, whereby liquid fuel is converted into gas fuel;
   a combustion chamber;
   a conduit coupling said fuel conversion chamber to said combustion chamber, whereby gas fuel is delivered into said combustion chamber;
   an ignition source, said ignition source igniting the gas fuel;
   a plurality of temperature sensors coupled to said fuel conversion chamber, said combustion chamber, said air heat exchanger, and said water chamber;
   a plurality of pressure sensors coupled to said fuel conversion chamber, said combustion chamber, said air heat exchanger, and said water chamber; and
   a controller coupled to said plurality of temperature sensors and said plurality of pressure sensors,
   whereby the liquid fuel is converted into the gas fuel and burned providing energy to do work.

6. A thermoreactor as in claim 5 further comprising:
   a plurality of valves coupled to said fuel conversion chamber, said combustion chamber, said air heat exchanger, and said water chamber, and said controller.

7. A thermoreactor as in claim 1 further comprising:
   a linear to rotational motion conversion device coupled to said thermoreactor.

8. A thermoreactor as in claim 1 wherein:
   said linear to rotation motion conversion device comprises a rotor having a surface transverse to the axis of a rotating shaft.

9. A thermoreactor comprising:
   a fuel conversion chamber;
   a heater heating said fuel conversion chamber, whereby liquid fuel is converted into gas fuel;
   a combustion chamber, said fuel conversion chamber placed within a portion of said combustion chamber, whereby said fuel conversion chamber is heated by exhaust gas formed in said combustion chamber;
   a conduit coupling said fuel conversion chamber to said combustion chamber, whereby gas fuel is delivered into said combustion chamber;
   a nozzle connected to said conduit;
   a resonance chamber placed adjacent said nozzle, whereby the gas fuel is injected into said resonance chamber by said nozzle;
   an ignition source, said ignition source igniting the gas fuel,
   whereby the liquid fuel is converted into the gas fuel and burned providing energy to do work.

10. A thermoreactor used to convert a liquid fuel to a gas fuel comprising:
    a fuel conversion chamber;
    a heater heating said fuel conversion chamber, whereby liquid fuel is converted into gas fuel;
    a combustion chamber, said fuel conversion chamber placed within a portion of said combustion chamber, whereby said fuel conversion chamber is heated by exhaust gas formed in said combustion chamber;
    an air heat exchanger adjacent said combustion chamber;
    an air metering valve connected to said air heat exchanger and said combustion chamber;
    a temperature sensor placed within said combustion chamber;
    a pressure sensor placed within said combustion chamber;
    a conduit coupling said fuel conversion chamber to said combustion chamber, whereby gas fuel is delivered into said combustion chamber;
    a carbon separated coupled to said conduit;
    a converted fuel metering valve coupled to said conduit
    a nozzle connected to said converted fuel metering valve;
    a resonance chamber placed adjacent said nozzle, whereby the gas fuel is injected into said resonance chamber by said nozzle converting kinetic energy of the gas fuel into acoustical energy;
    a free piston placed within said resonance chamber;
    an ignition source, said ignition source igniting the gas fuel; and
    a controller coupled to said heater, air metering valve, temperature sensor, pressure sensor, converted fuel metering valve, and ignition source,
    whereby the liquid fuel is converted into the gas fuel and burned providing energy to do work.

11. A thermoreactor used to convert a liquid fuel to a gas fuel as in claim 10 further comprising:
    a heat exchanger and water chamber coupled to said combustion chamber.

12. A thermoreactor used to convert a liquid fuel to a gas fuel as in claim 10 further comprising:
    a piston coupled to said combustion chamber.

13. A thermoreactor used to convert a liquid fuel to a gas fuel as in claim 10 further comprising:
    an air tank providing air to said combustion chamber;

a compressor coupled to said air tank;

a filter filtering air provided to said compressor; and a heat exchanger heating air provided to said compressor, whereby air is filtered and heated prior to entering said combustion chamber.

14. A method of converting and burning fuel comprising:

placing liquid fuel in a fuel conversion chamber;

heating the liquid fuel converting the liquid fuel into a gas fuel;

injecting the gas fuel into a combustion chamber;

applying ultrasonic waves to the gas fuel; and burning the gas fuel, whereby liquid fuel is converted to gas fuel.

15. A method as in claim 14 further comprising:

using the hot gas from the burned gas fuel to heat the fuel conversion chamber.

16. A method as in claim 14 further comprising:

using the hot gas from the burned gas fuel to heat air.

17. A method as in claim 14 further comprising:

using the hot gas from the burned gas fuel to heat water.

18. A method of extracting hydrogen from hydrocarbon fuels comprising:

atomizing the hydrocarbon fuel;

heating the atomized hydrocarbon fuel in the absence of oxygen and in the presence of ultrasonic waves;

converting the heated atomized hydrocarbon fuel into a different hydrocarbon fuel; and releasing carbon and hydrogen from the different hydrocarbon fuel.

19. A method as in claim 18 wherein:

said step of converting the heated atomized hydrocarbon fuel into the different hydrocarbon fuel comprises the following conversions $$C_6H_{14} \rightleftharpoons C_4H_{10} + 2C + 2H_2$$
$$C_4H_{10} \rightleftharpoons CH_4 + 3C + 3H_2$$
$$CH_4 \rightleftharpoons C + 2H_2.$$

20. A method of converting a hydrocarbon fuel comprising:

injecting hydrocarbon fuel into a conversion chamber;

atomizing the hydrocarbon fuel in the conversion chamber;

heating the atomized hydrocarbon fuel in the absence of oxygen and in the presence of ultrasonic waves;

converting the atomized hydrocarbon fuel to a different fuel;

freeing carbon and hydrogen from the different fuel, whereby the free carbon and hydrogen are capable of being collected.

21. A method of converting a hydrocarbon fuel as in claim 20 wherein:

said step of converting the heated atomized hydrocarbon fuel to the different fuel comprises the following conversions $$C_6H_{14} \rightleftharpoons C_4H_{10} + 2C + 2H_2$$
$$C_4H_{10} \rightleftharpoons CH_4 + 3C + 3H_2$$
$$CH_4 \rightleftharpoons C + 2H_2.$$

22. A method of generating heat comprising:

heating atomized hydrocarbon fuels to a high temperature in the absence of oxygen and in the presence of ultrasonic waves;

extracting hydrogen and carbon from the heated atomized hydrocarbon fuels and forming gaseous fuels;

injecting the gaseous fuels with hypersonic velocity into a resonance chamber;

generating ultrasonic waves in the resonance chamber;

mixing the gaseous fuels with superheated air; and igniting the gaseous fuels and air, whereby a plasma is formed.

23. A method of generating heat as in claim 22 further comprising:

extracting the heat from the plasma to generate steam.

24. A thermoreactor for burning a fuel comprising:

a combustion chamber;

an ultrasonic device within said combustion chamber, said ultrasonic device capable of generating an ultrasonic field; and a fuel nozzle positioned to inject the fuel into the ultrasonic field.

25. A thermoreactor for burning gaseous fuels as in claim 24 wherein:

said ultrasonic device comprises a resonance chamber and a free piston placed within the resonance chamber.

26. A thermoreactor for burning gaseous fuels as in claim 24 further comprising:

a heat exchanger coupled to said combustion chamber; and a steam generator coupled to said heat exchanger.

27. A thermoreactor for burning gaseous fuels as in claim 26 further comprising:

a motor coupled to said steam generator.

* * * * *